United States Patent
Sun et al.

(10) Patent No.: US 7,505,841 B2
(45) Date of Patent: Mar. 17, 2009

(54) VISION-BASED OCCUPANT CLASSIFICATION METHOD AND SYSTEM FOR CONTROLLING AIRBAG DEPLOYMENT IN A VEHICLE RESTRAINT SYSTEM

(75) Inventors: Qin Sun, Kokomo, IN (US); Hongzhi Kong, Shanghai (CN); David L. Eiche, Noblesville, IN (US); Victor M. Nieto, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/218,671

(22) Filed: Sep. 2, 2005

(65) Prior Publication Data
US 2007/0055427 A1    Mar. 8, 2007

(51) Int. Cl.
G06K 9/46       (2006.01)
G06K 9/62       (2006.01)
G06G 7/00       (2006.01)
G06F 7/00       (2006.01)
G06F 17/00      (2006.01)

(52) U.S. Cl. ............... 701/45; 701/1; 701/36; 382/155; 382/156; 382/171; 382/181; 382/190; 382/191; 382/192; 382/193; 382/194; 382/195; 382/199; 382/206; 382/207; 382/209; 382/210; 382/221; 382/224; 382/225; 382/226; 382/227; 382/260; 382/261; 382/262; 382/263; 382/264; 382/265; 345/7; 345/8; 345/9; 345/419; 345/581; 345/582; 345/611; 345/612; 345/613; 345/614; 345/615; 375/240.29

(58) Field of Classification Search ............... 701/1, 701/36, 45; 345/7–9, 419, 581–582, 611–615; 382/173, 181, 190–195, 199, 206–217, 221, 382/224–227, 260–265, 171, 155, 156; 375/240.29
See application file for complete search history.

(56) References Cited

U.S. PATENT DOCUMENTS 5,719,954 A * 2/1998 Onda .................. 382/154

(Continued)

FOREIGN PATENT DOCUMENTS

WO          0230717          4/2002

OTHER PUBLICATIONS

Disparity Based Image Segmentation For Occupant Classification Kong, H.; Qin Sun; Bauson, W.; Kiselewich, S.; Ainslie, P.; Hammoud, R.; Computer Vision and Pattern Recognition Workshop, 2004 Conference on 27-02 Jun. 2004 pp. 126-126.*
Occupant classification system for automotive airbag suppression Farmer, M.E.; Jain, A.K.; Computer Vision and Pattern Recognition, 2003. Proceedings. 2003 IEEE Computer Society Conference on vol. 1, Jun. 18-20, 2003 pp. I-756-I-761 vol. 1.*
EP Search Report dated Mar. 21, 2007.

*Primary Examiner*—Jack W. Keith
*Assistant Examiner*—Chuong P Nguyen
(74) *Attorney, Agent, or Firm*—Jimmy L. Funke (57) ABSTRACT

A vehicle restraint system has a vision-based occupant classification system for control of airbag deployment during a crash scenario. The classification system utilizes two imaging sensors which together create a stream of paired images received and stored by an occupant classification controller. A computer program product of the controller utilizes the paired images to extract disparity/range features and stereo-vision differential edge density features. Moreover, the controller extracts wavelet features from one of the two paired images. All three features or maps are classified amongst preferably seven classifications by algorithms of the computer program product producing class confidence data fed to a sensor fusion engine of the controller for processing and output of an airbag control signal input into a restraint controller of the vehicle restraint system.

11 Claims, 5 Drawing Sheets

U.S. PATENT DOCUMENTS

| | | | | |
|---|---|---|---|---|
| 5,983,147 | A * | 11/1999 | Krumm | 701/45 |
| 6,459,973 | B1 * | 10/2002 | Breed et al. | 701/45 |
| 6,459,974 | B1 * | 10/2002 | Baloch et al. | 701/45 |
| 6,548,804 | B1 | 4/2003 | Yuhara et al. | |
| 2002/0181743 | A1 * | 12/2002 | Khairallah et al. | 382/104 |
| 2003/0040859 | A1 * | 2/2003 | Farmer | 701/45 |
| 2003/0204384 | A1 | 10/2003 | Owechko et al. | |
| 2004/0153229 | A1 * | 8/2004 | Gokturk et al. | 701/45 |
| 2005/0090957 | A1 | 4/2005 | Luo et al. | |
| 2005/0175243 | A1 * | 8/2005 | Luo et al. | 382/224 |
| 2005/0201591 | A1 * | 9/2005 | Kiselewich | 382/104 |

* cited by examiner

VISION-BASED OCCUPANT CLASSIFICATION METHOD AND SYSTEM FOR CONTROLLING AIRBAG DEPLOYMENT IN A VEHICLE RESTRAINT SYSTEM

FIELD OF THE INVENTION

The present invention relates to method and system for controlling a vision-based occupant classification airbag deployment in a vehicle restraint system.

BACKGROUND OF THE INVENTION

The United States National Highway Traffic Safety Administration, NHTSA, has recognized that earlier generation airbag systems designed to enhance safety and vehicle seat belt restraint systems can potentially cause injury during a crash scenario especially when the occupants are not properly situated within the vehicle and/or restrained by a seat belt. As such, the NHTSA allowed automotive manufacturers the option to reduce the inflation power or aggressiveness of the first generation airbags to lessen the likelihood of an airbag related injury. These less powerful airbags are typically known as "de-powered" airbags and have been in most vehicles since 1997.

As an added precaution, the NHTSA required manufacturers to introduce an "advanced frontal airbag" which is designed to meet the needs of the occupant in a variety of specific crash scenarios. The advanced airbag systems automatically determine if and with what level of power the driver frontal airbag and the passenger frontal airbag will inflate. The appropriate level of power is generally based upon sensor inputs that can typically detect: 1) occupant size, 2) seat position, 3) seat belt use of the occupant, and 4) crash severity. Advance frontal airbags were generally designed to reduce the risk of airbag induced injury to children and adults of small stature. All passenger cars and light trucks produced after Sep. 1, 2006 in the United States are required to have the advanced frontal airbag system.

Various occupant-detection devices are known to communicate with a controller of the advanced frontal airbag system requiring the system to take appropriate action(s) (i.e. disabling the airbag in a crash). A weight-based occupant-detection system is one such device that utilizes a bladder installed in a passenger-side seat that senses weight distribution in the seat. A microcontroller in the device uses an algorithm to analyze the weight distribution and determine if the occupant may be injured by the airbag. Unfortunately, the weight-based devices are generally not designed to detect if an occupant is out of position. Yet further, such devices are not capable of differentiating between an empty seat with an inanimate object and a seat with a child. Consequently, during a crash scenario, a passenger frontal airbag could actuate without need.

Visual or imaging based systems are known that measure various features of at least one image, establish confidence levels and fuse the features together to compute an "occupant type" which in-turn is used to, for instance, enable or disable a vehicle airbag. Such a system is disclosed in U.S. Patent Application Publication 2003/0204384 A1, published Oct. 30, 2003 and incorporated herein in its entirety. Such features include an edge density taken from a single image, a wavelet feature taken from a single image, and a disparity feature that requires "stereo" images from two independent cameras. A sub-classifier of each feature independently assigns a confidence value to each one of five occupant classifications known to be: rear-facing infant seat; front-facing infant seat; adult; out of position adult; and empty seat. The fifteen class confidences are then input into a fusion classifier that is trained to intelligently combine the confidences to form a final airbag enable/disable decision.

Unfortunately, the five classification system is limited and does not include other categories such as "a child inside of an at-risk-zone" or "a child outside of an at-risk-zone" which could further refine airbag safety. Moreover, known software algorithms used to classify the three known features are likely to become confused between categories if required to handle the additional two classifications. Furthermore, additional classifications will increase the size of the neural network making training of the network more difficult. Therefore, more efficient and more effective features and methods to fulfill the seven-category-classification task are desired.

SUMMARY OF THE INVENTION

A vision-based occupant classification method and/or system controls airbag deployment during a crash scenario. Two imaging sensors create a stream of paired images received and stored by an occupant classification controller. A computer program product of the controller utilizes the paired images to extract disparity/range features and stereo-vision differential edge density features. Moreover, the controller extracts wavelet features from one of the two paired images. All three features or maps are classified amongst preferably seven classifications by algorithms of the computer program product producing class confidence data fed to a sensor fusion engine of the controller for processing and output of an airbag control signal input into a restraint controller of the vehicle restraint system.

The vision-based occupant classification method and/or system preferably has a seven-category classifier which departs from the traditional five by including "a child inside of the at-risk-zone" and "a child outside of the at-risk-zone." Potential confusion between categories created by the additional two categories is eliminated by a disparity based segmentation of the image which reduces the influence of irrelevant background information to the classification. Moreover, a spatial filter is applied over the disparity features or map in order to extract more consistent disparity/range features over time, along with a predetermined adaptive offset map and average threshold map to counter possible inaccuracy of the disparity/range measurement. The stereo-vision edge density features are better suited to suppress noise and associate the occupant contour with depth perception data.

BRIEF DESCRIPTION OF THE DRAWINGS

The presently preferred embodiments of the invention are disclosed in the following description and in the accompanied drawings, wherein.

DETAILED DESCRIPTION OF PREFERRED EMBODIMENTS

Figure 1:
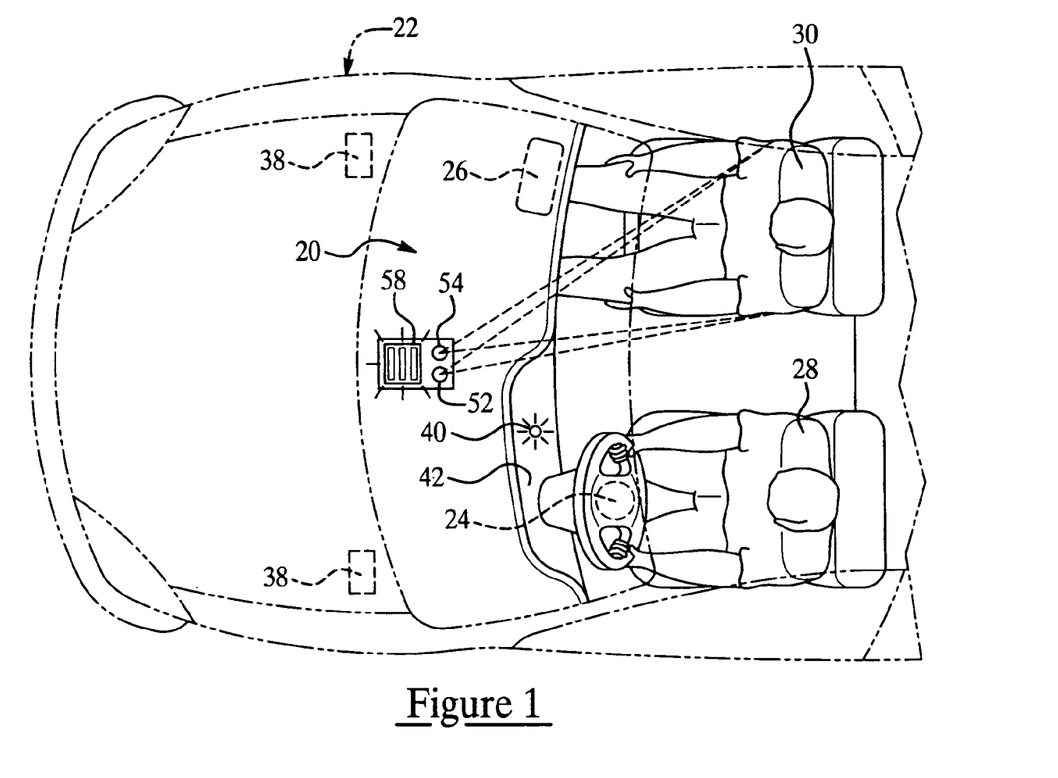
FIG. 1 is a top view of a vehicle with portions broken away to show detail of a restraint system using the classification of the present invention.
Figure 2:
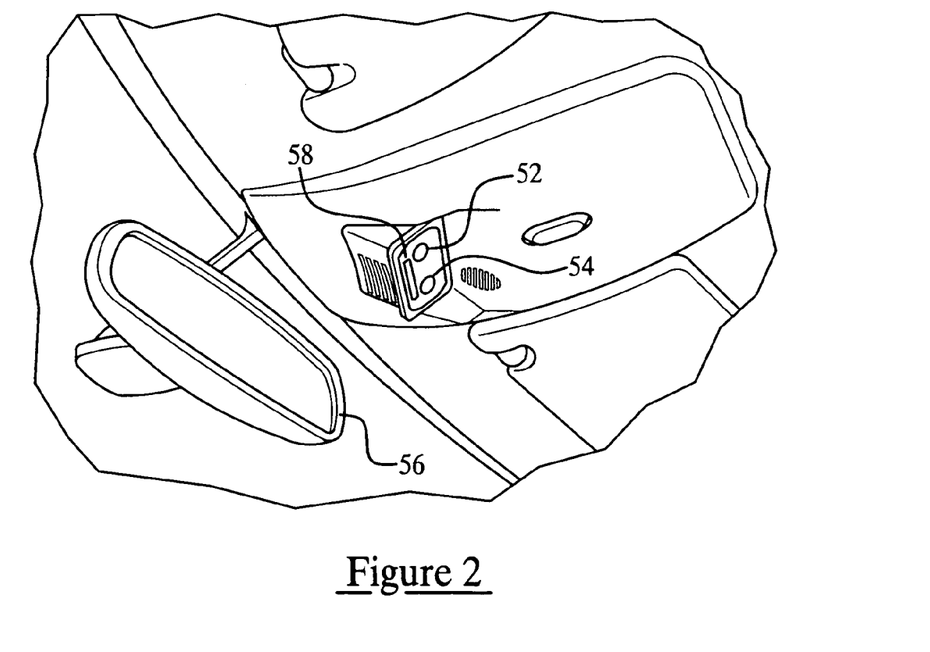
FIG. 2 is a perspective view of first and second imaging sensors of the classification system.
Figure 3:
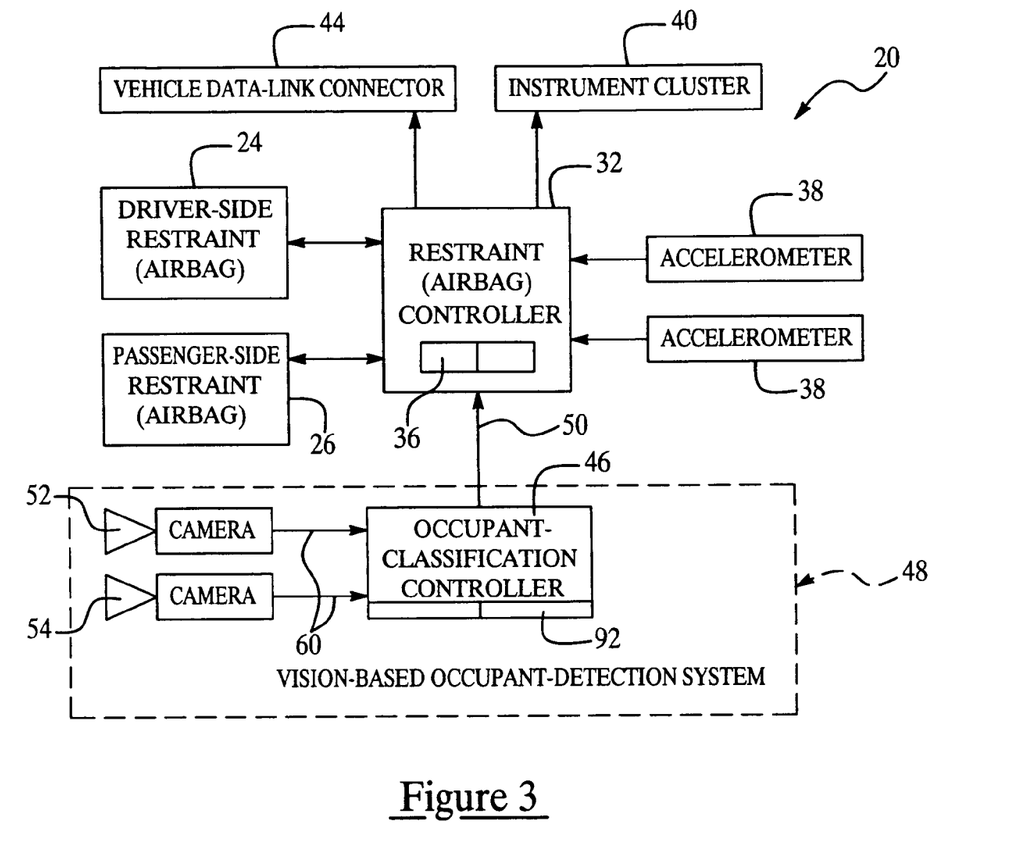
FIG. 3 is a block diagram of the restraint system shown in FIG. 1.

Referring to FIGS. 1-3, a restraint system 20 of a vehicle 22 preferably has a frontal operator airbag 24 and a frontal passenger airbag 26 along with corresponding seat belt devices known in the art. Each airbag 24, 26 preferably inflates independently during a frontal crash of the vehicle 22 to protect the occupants which include a driver 28 and a passenger 30 facing the respective airbags 24, 26. The restraint system 20 has a restraint controller 32 that initiates the airbag inflation by sending an electrical signal to an inflator of the restraint system 20. A microprocessor 36 controls the controller that deploys each airbag 24, 26 separately. The microprocessor 36 determines when a crash is occurring by electrical input signals received from at least one and preferably a plurality of accelerometers 38 that indicate a change in velocity with time or rapid deceleration. A large deceleration indicates that a crash is in progress. The microprocessor 36 of the restraint controller 32 has software calibrations that determine the magnitude of deceleration indicative of a crash for a particular vehicle.

The vehicle restraint controller 32 can preferably diagnose the restraint system 20. If a problem is detected by the restraint controller 32, a telltale indicator 40 on an instrument cluster 42 of the vehicle 22 can warn the driver 28 audibly and/or visually. The controller 32 can also send an electrical diagnostic signal to a remote tester that a technician can connect to a vehicle data link or serial bus 44 used for communication.

A classification controller 46 of a vision-based occupant-classification device or system 48 of the restraint system 20 classifies the occupant 28, 30 and periodically electrically transmits its classification 50 to the vehicle restraint controller 32 preferably using a data bus. Dependent upon the input classification signal 50, the restraint controller 32 can disable the passenger-side or driver-side airbags 26, 24, preventing either from deploying even in the event of a crash. The vision-based occupant-classification system 48 also communicates with the restraint controller 32 to control the intensity of the airbag deployment, or prevent deployment altogether, depending upon a variety of pre-established parameters. The system preferably utilizes two imaging sensors 52, 54, or video cameras, to analyze the image of a person or object near an airbag for classification. Image classifications generally include: 1) rear-facing infant seat (RFIS); 2) front-facing infant seat (FFIS); 3) adult normal or twisted position (Adult NT); 4) adult out of position (Adult OOP); 5) child normal or twisted position (Child NT); 6) child out of position (Child OOP); and 7) empty seat (Empty). For instance, front-seat passenger 26 may be considered out of position if his/her head or torso is within twelve inches of the dashboard 40. An empty seat is not necessarily completely empty but may have inanimate objects (for example, a box or newspaper) placed upon it.

Generally, the vision-based occupant-classification device 48 disables either airbag 24, 26 for "Adult OOP" and "Child OOP" classifications and for RFIS (because the head of the infant in such a seat is near the dashboard) upon the classification input signal 50 from the classification controller 46 to the restraint controller 32. Child NT is also a case for disabling the airbag 26, while Adult NT is preferably a case for enabling the airbag 26. The airbag is preferably disabled for the FFIS classification to eliminate any possible harm to the child, and the airbag 26 is preferably disabled for an empty seat to save the cost of replacing the airbag after a crash.

The occupant-classification device uses the two cameras 52, 54 to obtain "stereovision" images of the occupants 28, 30 from two different perspectives. The cameras 52, 54 are preferably mounted near a rear-view mirror 56 of the vehicle 22 and next to an illuminator 58 that transmits light at an infrared wavelength which is generally invisible to the naked eye (as best shown in FIG. 2). Because the infrared light filters out other types of light, the illumination can be kept more uniform as ambient light levels change. The cameras 52, 54 register the images as a two-dimensional matrix of digital grayscale data, meaning that they are stored in discrete shades of gray, with each data value representing the intensity of a particular point in each image. Each of these points is called a pixel. The darkest pixels have the minimum value (zero) and the brightest pixels have the maximum value. The system preferably uses eight-bit data having a maximum value of about 255. The classification controller 46 of the occupant-classification system 48 controls the system and electrically receives the stream of image data 60 from the cameras. Knowing the distance between the cameras 52, 54 and having two perspectives, the classification controller 46 is able to estimate the range or distance of objects in the images from the cameras, providing the depth of the objects in the images. This third dimension or depth perception is desirable for classifying the image.

Image-classification Algorithms

Figure 4:
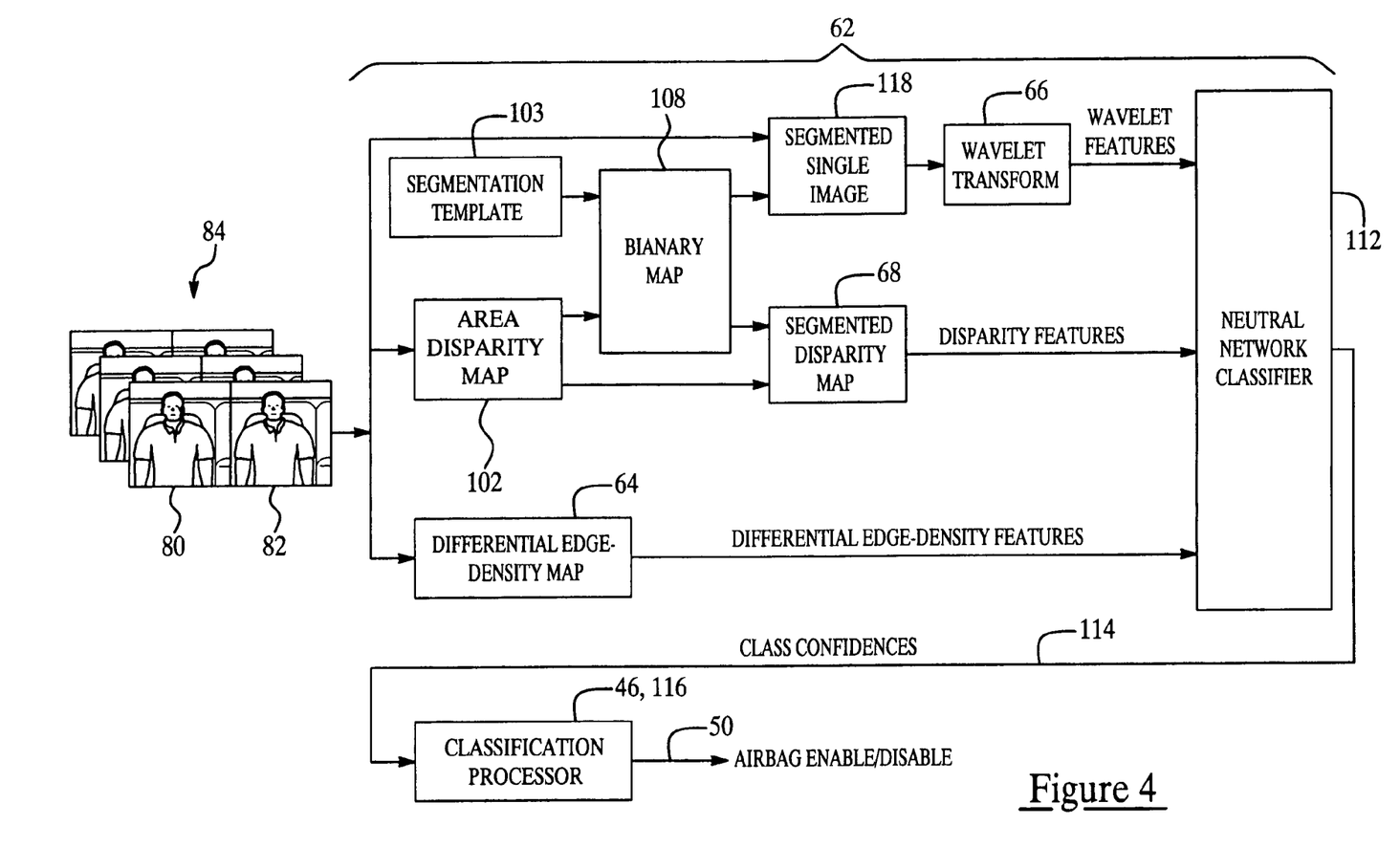
FIG. 4 is a block diagram of a software medium of a vision-based occupant classification method and/or system of the restraint system.
Figure 5:
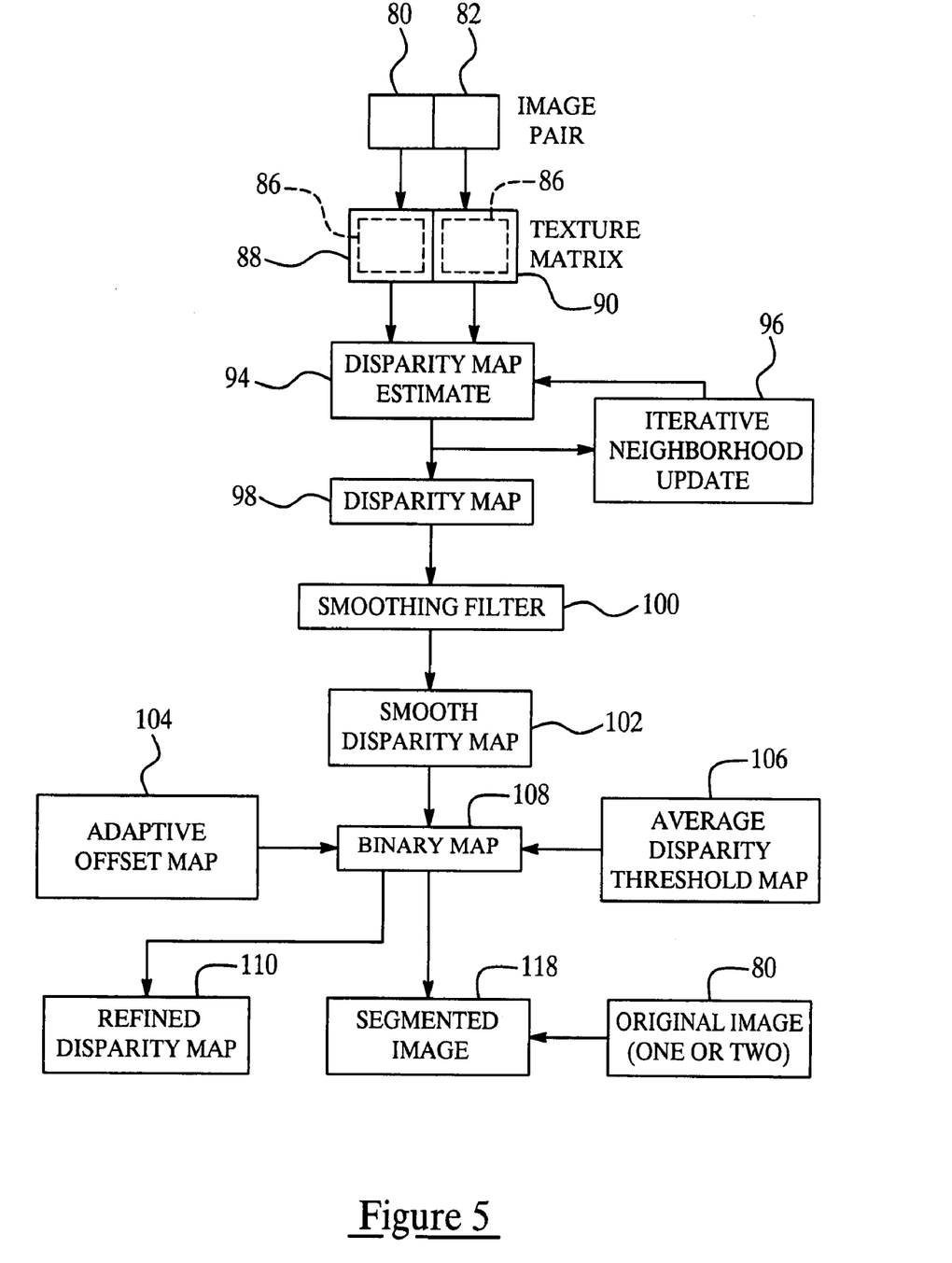
FIG. 5 is a flow diagram illustrating the extraction of a refined disparity map for classification and the processing of a segmented image.
Figure 7:
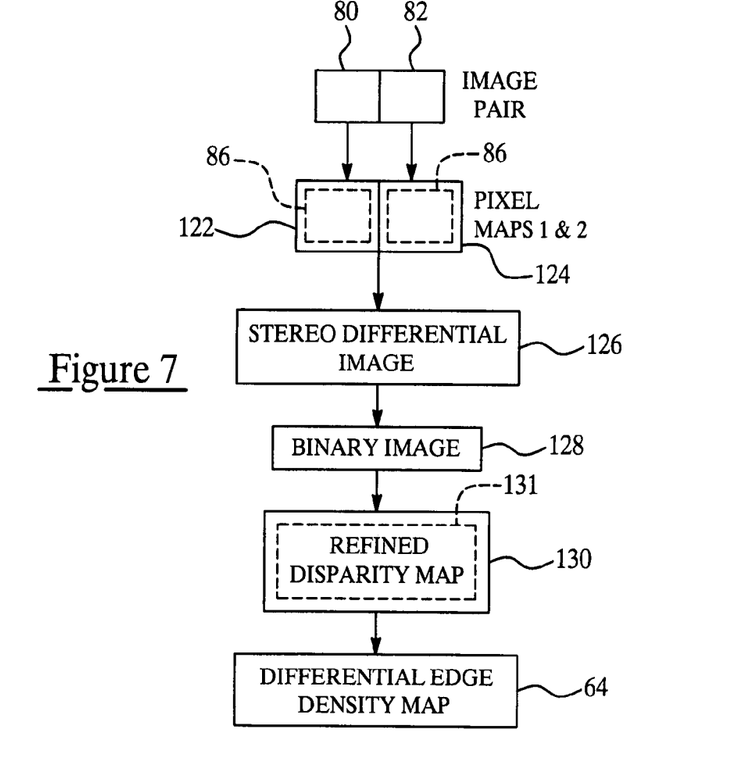
FIG. 7 is a flow diagram illustrating the extraction of a differential edge density map for classification.

Referring to FIGS. 4, 5 and 7, a computer readable medium 62 of the occupant detection system 48 has encoded image-classification algorithms which perform a series of mathematical operations on each "snap-shot" or image of video data or paired stream of images 60. The system computer readable medium or software 62 generally uses three distinct algorithms. The output of each algorithm is an array or matrix of confidence values called features. The features or maps are generally termed: differential edge density features 64; wavelet features 66; and disparity features 68. Preferably, the software 62 and controller 46 operate with sufficient speed to process pairs of images 80,82 produced by the cameras at a pre-established rate of preferably about thirty to fifty updates per second.

Smoothed/Temporal Disparity Feature

Referring to FIGS. 4 and 5, the first algorithm is a range or disparity feature calculation. The disparity feature calculation requires snap shots of the paired images 80, 82 from the stream of images 84 produced by respective cameras 52, 54. A pre-determined region of interest 86 (ROI) of the paired images is divided into a matrix or set of small areas by the encoded instructions 62. As an example, the ROI for the disparity feature is preferably about 192 pixels horizontally by 220 pixels vertically. The first algorithm calculates a separate disparity value for each of 352 equal-sized areas within the ROI. Each of these areas has dimensions of twelve pixels horizontally by ten pixels vertically. These dimensions are for a particular vehicle application and are likely to change dependent upon the application.

Figure 8:
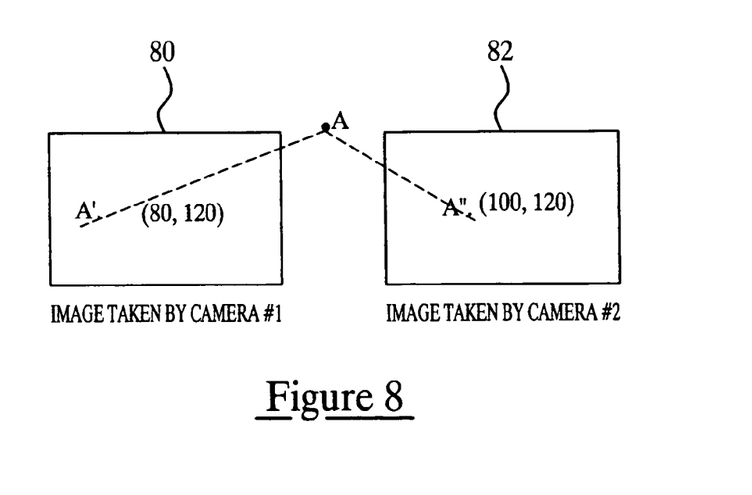
FIG. 8 is a block diagram illustrating a vector relationship between pixels of respective paired images.

The ultimate goal of the disparity algorithm is to determine a set of confidences or disparity features related to the range of each of the small areas from the paired images 80, 82 of the cameras 52, 54, thus giving a third dimension to the ROI 86. This feature is not expressed in terms of range but of disparity, which is proportional to the inverse of the range. Referring to FIG. 8, the concept of disparity between point A' and point A" in the set of stereo images 80, 82 is illustrated. The first image 80 taken from the first camera 52 denotes the first point A'. The second image 82 taken from the second camera 54 illustrates the corresponding first point A". A horizontal and a vertical coordinate is assigned to the point A' on the first image 80 and differing coordinates on the second image 82 for point A". The positions of the two points differ due to the difference in perspective of each camera. Preferably, the cameras 52, 54 are placed so that the vertical coordinates of identical features in each image are identical. The horizontal coordinates do differ and their difference is the disparity. Because the disparity is proportional to the inverse of the range of the features from the cameras 52, 54, the closer a feature in the image is to the cameras, the greater the disparity. As an example, for points A' and A" in FIG. 8, the disparity is twenty.

In order to estimate the disparities in a paired set of small areas, the first algorithm must identify pairs of points in one image that correspond to points in the other image. After partitioning the ROI 86 into a two-dimensional matrix of small disparity areas with equal size, the range algorithm identifies those areas with significant texture producing a texture matrix 88, 90 of the ROI 86 of each image 80, 82. An area with a significant amount of texture exhibits a large variation in the intensities of the pixels within the area. Areas with little texture are difficult to differentiate from others due to their lack of distinguishing features.

Once the classification controller 46 identifies the high-texture areas in one image 80, the algorithm identifies areas in the other image 82 that are likely matches. For each high-texture area of the first texture matrix 88 of the first image 80, the algorithm finds the best match in the other texture matrix 90 of the other image 82 and stores to memory 92 the computed disparity between these sets of areas as a disparity map estimate 94. At this point, the disparities of the low-texture areas are not assigned. The algorithm then uses an iterative technique, or iterative neighborhood update 96, to compute the disparity of all the areas in the disparity map estimate 90, including those with disparities already assigned to them. The technique bases the computed disparity of a given image not only on a match with an area in the other image, but also on the computed disparity of neighboring or adjacent areas. The result of the analysis is a two-dimensional disparity map 98.

A smoothing operation or 3×3-smoothing filter 100 is then applied to the disparity map 98 to make the ultimate disparity features more consistent over time. Assuming (i, j) is the center location of the smoothing filter and $D_{i,j}$ represents the disparity value at that location, the smoothing operation is defined as replacing $D_{i,j}$ with:

$$\left(\sum_{m=-1}^{1} D_{i-1,j+m} + \sum_{m=-1}^{1} D_{i,j+m} + \sum_{m=-1}^{1} D_{i+1,j+m}\right)/9$$

This operation is applied to each pixel of the disparity map 98 that has eight-way neighbors. A resultant smoothed disparity map 102 is generated and is used for segmentation and extracting range or disparity features.

A pre-determined segmentation template 103 which generally includes an adaptive offset map 104 and an average disparity threshold map 106, which takes various lighting environments into account and empirically compensates for inherent flaws of the disparity algorithm, is applied to the smooth disparity map 102 producing a binary map 108 for ultimately discarding portions of the ROI 86 to achieve higher confidence values of both the disparity features and the wavelet features.

Figure 6:
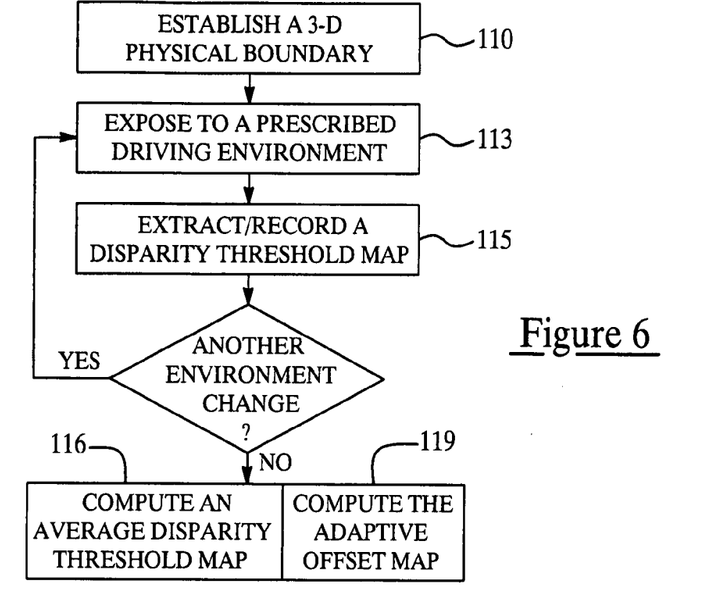
FIG. 6 is a flow diagram illustrating the computation of an average disparity threshold map and adaptive offset map.

Referring to FIG. 6, the pre-determined disparity threshold map 106 is generally created from a physical boundary 110, which contains the maximum volume within which the occupant(s) 28, 30 will be classified. To reduce the influence of noise, the disparity threshold map uses disparity values averaged over about one hundred frames or snap-shots. The physical boundary is exposed to various driving environments 112 to get a set of disparity threshold maps 114. The averaged disparity values of this set of maps compose the final disparity threshold map 116. Furthermore, the standard deviation of each pixel in the disparity threshold map is calculated and used as an adaptive offset map 118 for image segmentation.

The segmentation is achieved by comparing the measured disparity values of the smoothed disparity map 102 and the disparity threshold values of the disparity threshold map 116 for each small area of the smooth disparity map 102. For instance, in a given location (i, j), assume the measured disparity value is $D_m(i, j)$ and the disparity threshold is $D_{th}(i, j)$. A new binary map B(i, j) 108 with the same matrix correlation as the disparity map of the original images 80, 82 is created with the following rules:

If $D_m(i,j) <= D_{th}(i,j) + \delta(i,j)$ then $B(i,j)=0$ otherwise $B(i,j)=1$

The parameter $\delta(i, j)$ is the standard deviation of disparity in the location (i, j) of the adaptive offset map 104. It is used to control the degree of background suppression. A larger $\delta(i, j)$ indicates more uncertainty of the disparity measurement in the location and therefore, the image segmentation should be less dependent on disparity. Such an adaptive offset will ensure that the image segmentation will be applied only to the region where the disparity estimate is reliable. For example, it reduces the over segmentation of images of child occupants and makes it possible to classify child positions correctly. The binary map 108 is applied as a mask over the smooth or area disparity map 102 with areas, B'(i, j), corresponding to "zeros" being blocked out and the areas corresponding to "ones" remaining unchanged to calculate, or segment into, the refined or segmented disparity map 68. A seven-category neural network classifier 112 receives the refined disparity map 68 and together with the wavelet and differential edge-density features outputs preferably seven class confidences 114 for processing by the classification controller 46.

Wavelet Feature

The second algorithm is a wavelet feature calculation which generally utilizes the binary map 108 calculated from the disparity algorithm to develop a segmented image 118. The binary map 108 applies as a mask over any one of the original paired images 80, 82. The original image areas corresponding to "zeros" in B'(i, j) are blocked out and the areas corresponding to "ones" in B'(i, j) remain unchanged. Therefore, the segmented image 118 is still a gray level image with the irrelevant background being masked out. The image applied is from only one of the two cameras 52, 54 and must be consistent over time (i.e. from the same image stream).

A wavelet ROI of the segmented image 118 is divided into a set of wavelet areas preferably being larger the small disparity areas previously described. As the continuing example, there may be four sets of wavelet areas with two sets consisting of 32×32 pixels, and two sets having 64×64 pixels each. The pixels used for the wavelet calculation are preferably down-sampled by two. That is, every second pixel is skipped during sampling, although the total number of pixels sampled is not reduced. Thus, each sampled wavelet area is 64×64 and 128×128 in size, respectively. Preferably. The small wavelet regions preferably overlap each other for providing an "over-complete" sampling of the image data providing more information than would a set of areas that did not overlap.

In each of the wavelet areas, pixels in an upper half of the wavelet area are subtracted from pixels in a lower half of the wavelet area, producing a vertical wavelet coefficient for that area. In the same areas, pixels in a left half are subtracted from pixels in a right half, producing a horizontal wavelet coefficient for the area. Each wavelet area thus has two features associated with it, one horizontal and one vertical producing the combined wavelet transform or map 66. The seven-category neural network classifier 112 receives the wavelet features and together with the disparity features and differential edge-density features outputs preferably seven class confidences 114 for processing by the classification controller or processor 46.

Stereo-Vision Edge Density Feature

Referring to FIGS. 4 and 7, the stereo-vision edge density feature is preferred for the novel seven-category system. The differential edge density algorithm of the computer readable medium 62 examines each pixel of each original image 80, 82 that has eight neighboring pixels (i.e. pixels not on the outer border of the images). The algorithm analyzes the neighbor of each pixel in the pre-determined ROI 86 of the original images to determine if the intensity of the image is changing significantly near that point. Pixels with a large difference in intensity relative to their neighbors are considered to be edge pixels. A matrix of pixel intensities, termed pixel map 122, 124 is generally developed for the ROI 86 of each respective original image 80, 82.

In practice, $A_{i,j}$ and $B_{i,j}$ are a stereo image pair at pixel location (i,j) of respective pixel maps 122, 124. An offset-compensated and intensity normalized stereo differential image $C_{i,j}$ 126 is constructed according to:

$$C_{i,j} = \frac{|B_{i+\text{H\_offset}, j+\text{V\_offset}} - A_{i,j}|}{B_{i+\text{H\_offset}, j+\text{V\_offset}} + A_{i,j}} \times \text{Full\_Pixel\_Depth} \quad (1)$$

For a horizontal stereo configuration, H_offset is the horizontal correspondence value averaged in the field of view when an object is at a distance of infinity. Similarly, the parameter V_offset is the averaged pixel location difference in the vertical direction of a correspondence point between the stereo images 80, 82 at different object distances. These offset values can be determined through initial camera configuration calibrations. The Full_Pixel_Depth is simply the maximum scale of the pixel grey level. For example, for an eight-bit pixel depth, this parameter would be about 255. The offset compensation is intended to suppress far field objects (background) so that the foreground object can be naturally segmented. The image intensity normalization and scaling improves the image visibility and contrast. Such a stereo differential image is essentially an estimated edge density map where the width of the edge shown is wider when the object is closer to the cameras.

Note that the image normalization and scaling described by equation (1) may amplify noises in the extreme dark region of the image. In order to suppress these noises, a pre-determined pixel intensity threshold referred to as Threshold_A is used to construct a final stereo differential image $C'_{i,j}$ 126 with the following rules:

If $B_{i+\text{H\_offset}, j+\text{V\_offset}} + A_{i,j} >$ Threshold_A, then $$C'_{i,j} = \frac{|B_{i+\text{H\_offset}, j+\text{V\_offset}} - A_{i,j}|}{B_{i+\text{H\_offset}, j+\text{V\_offset}} + A_{i,j}} \times \text{Full\_Pixel\_Depth} \quad (2)$$

Otherwise, $C'_{i,j}=0$.

New image features termed as "stereo differential edge densities" are then extracted from the final stereo differential image $C'_{i,j}$ 126. This extraction first converts the final stereo differential image $C'_{i,j}$ 126 into a binary image $D_{i,j}$, or binary map 128, with a pre-determined differential intensity threshold, Threshold_B, by the following rule:

If $C'_{i,j}>$Threshold_B then $D_{i,j}=255$ Otherwise $D_{i,j}=0$.

Unlike traditional edge filters such as the Sobel filter, this process produces "solid" edges from the stereo differential images and reserves the thickness of the edges. The thickness contains wanted range information of the object.

Secondly, the extraction then applies morphological operations on the binary map 128 to remove smaller particles generally denoting noise. Preferably, one erosion process followed by one dilation process is applied to the binary map 128 to achieve a refined binary map 130.

Lastly, to gain the stereo differential edge density feature or map 64, the resultant binary image 130 is divided into a number of bins or density areas of a predetermined ROI 131. For instance, for an edge density ROI 131 having dimensions of 180 pixels horizontally by 220 pixels vertically, the dimensions of the areas where edge density is calculated are fifteen pixels horizontally by twenty-two pixels vertically. These dimensions are preferably pre-determined for a given vehicle application. The total number of non-zero pixels in each area is then counted as an image input feature. The differential edge density map 64 is a matrix of all the areas and is fed into the seven-category neural network classifier 112

Processing the Features to Classify the Image

The image feature generated by the three image-processing algorithms require further processing to obtain an image classification. A fusion engine, which is preferably the neural network classifier 112, accomplishes this for the vision system 48. The input to the network is an array of all the features computed for a particular image (differential edge density, wavelets, and range/disparity). The output is another array, with one value assigned to each of the possible classifications for the image. As discussed earlier, an image can have one of seven different classifications in the system (Adult NT, Adult OOP, Child NT, Child OOP, RFIS, FFIS and Empty). Hence, the neural network 112 supporting the classifications produces an array of seven values. Each computed value for each distinct classification is a number ranging from zero to one. The computed value represents a confidence value or "figure of merit" for its assigned image classification, with one indicating that the classification is very likely to apply to the image, and zero meaning the classification is very unlikely. The system 48 classifies the computed image based upon the highest classification value, which should be substantially greater than the other computed values.

The neural network classifier 112 performs a series of mathematical operations on the feature data to produce the classification array. These operations are always the same and use a large number of weighting calibrations that determine the outputs 114 of the neural network classifier 112. That is, the neural network classifier 112 generates the classification values based upon the calibrations defined for it. These constant weighting values are multiplied by the inputs to the network and by intermediate results that the network computes. They determine how the network generates its classification values.

The array of class confidences 114 is inputted into a processor 116 of the classification controller 46 which processes and outputs a restraint control signal or airbag enable/disable signal 50 to the restraint controller 32, as best shown in FIGS. 3 and 4.

Deriving the values of the calibrations amounts to training the network so that it "learns" how to classify images. Firstly, a separate computer-based system is preferably used to obtain training data. In the alternative, the occupant detection system 20 can include a special training mode to conduct the same operation. When running the training mode, a user enters the correct classification for each image that the system 48 is about to process. The system records the occupant's image that the system is about to process in the computer memory of the system that runs the training mode. The system records the occupant's image and computes the corresponding features, which it stores in a file with the user-defined classification. In a second step, another software program uses the feature arrays and associated classifications to determine the network's weighting values. This program chooses the calibrations so that the neural network generates the expected classifications for the feature data from the training set. The occupant-classification system includes these calibrations in its memory for use during normal operation of image classification.

To train the system effectively, the system needs to process a wide variety of images. This occupant-classification system 20 performs and demonstrates the ability to classify about ninety-eight percent of images correctly in tests.

Alternative—Mono-Vision Edge Density Feature

The stereo-vision edge density feature can be substituted with a known mono-vision edge density feature that produces lower confidence values but requires less software processing time. The mono-vision edge density feature uses only one of the two imaging sensors or cameras. The algorithm applied to calculate the mono-vision edge density feature examines each pixel of the image which has eight neighboring pixels (i.e. pixels not on the outer border of the image). The algorithm analyzes the neighbor of each pixel in the predetermined region of interest (ROI) of the image to determine if the intensity of the image is changing significantly near that point. Pixels with a large difference in intensity relative to their neighbors are considered to be edge pixels.

This algorithm builds an edge map, a new two-dimensional matrix of pixels, with edge pixels assigned a maximum value and others assigned a minimum value. Once the pixels have been analyzed, the algorithm divides the edge map into areas of equal size and computes the average value of the pixels in each area. This matrix of average values, representing the density of edges in each small area of the ROI of the image, are the features for this algorithm.

Although the preferred embodiments of the present invention have been disclosed, various changes and modifications can be made by one skilled in the art without departing from the scope and spirit of the invention as set forth in the appended claims. Furthermore, it is understood that the terms used here are merely descriptive rather than limiting and various changes may be made without departing from the scope and spirit of the invention.

We claim:

1. A method of vehicle occupant classification for controlling airbag deployment in a vehicle restraint system comprising the steps of:

receiving a first image from a first sensor of a predetermined region of interest occupied by a vehicle occupant by an occupant-classification controller;

simultaneously receiving a second image from a second sensor of the predetermined region of interest occupied by the vehicle occupant by the occupant-classification controller;

dividing the first and second images into an array of equal sized disparity areas;

computing a first texture matrix and a second texture matrix for the respective first and second images;

calculating a single disparity-map-estimate from the first texture matrix and the second texture matrix;

performing an iterative neighborhood update on the disparity map estimate to achieve a disparity map;

applying a smoothing filter to the disparity map to generate a smooth disparity map;

applying an average disparity threshold map and an adaptive offset map to the smooth disparity map to achieve a binary map;

extracting a refined disparity map from the binary map;

inputting the refined disparity map into a neural network classifier of the occupant-classification controller;

utilizing the binary map to develop a segmented single image for calculation of a wavelet transform;

inputting the wavelet transform into the neural network classifier for computation of an array of class confidences and processing the array of class confidences by a processor of the occupant-classification controller for output of the control signal to the vehicle restraint system;

computing a pixel disparity map from each paired pixel of the first and second images;

converting the pixel disparity map into another binary map;

extracting a stereo differential edge density map from the another binary map;

inputting the stereo differential edge density map into the neural network classifier; and outputting a control signal for controlling airbag deployment in the vehicle restraint system.

2. The method of vehicle occupant classification set forth in claim 1 wherein the neural network classifier includes a child inside of the at-risk-zone classification for computation.

3. The method of vehicle occupant classification set forth in claim 2 wherein the neural network classifier includes a child outside of the at-risk-zone classification for computation.

4. The method of vehicle occupant classification set forth in claim 1 comprising the further steps of:

computing a mono-vision edge density map from the first image; and inputting the mono-vision edge density map into the neural network classifier.

5. The method of vehicle occupant classification set forth in claim 1 comprising the further steps of:

establishing a three-dimensional physical boundary in a vehicle;

capturing a plurality of images including the first and second images of the physical boundary under varied conditions;

computing a condition-specific disparity map for each of the varied conditions; and computing the average disparity threshold map by averaging the condition-specific disparity maps together.

6. The method of vehicle occupant classification set forth in claim 5 comprising the further steps of:
computing a standard deviation for each disparity area;
arranging the standard deviations into the adaptive offset map; and
applying the adaptive offset map to the smoothed disparity map to achieve the binary map.

7. The method of vehicle occupant classification set forth in claim 1 comprising the further step of illuminating the predetermined region of interest with infrared light for imaging.

8. The method of vehicle occupant classification set forth in claim 1 comprising the further steps of calculating the average disparity threshold map by averaging disparity values taken over a period of time, between a plurality of images, and exposed to various driving environments.

9. The method set forth in claim 1 wherein the pixel disparity map is computed by constructing an offset-compensated and intensity normalized stereo differential image from the first and second images.

10. The method set forth in claim 9 wherein the pixel disparity map is converted into the other binary map by suppressing noise in the stereo differential image to yield a final stereo differential image and then extracting stereo differential edge densities from the final stereo differential image to yield the other binary map.

11. The method set forth in claim 10 wherein the stereo differential edge density map is extracted by applying morphological operations on the other binary map to yield a refined binary map, dividing the refined binary map into density areas having a predetermined region of interest, and establishing the stereo differential edge density map as a matrix of all of the density areas.

* * * * *